United States Patent
Markling

(10) Patent No.: US 6,464,305 B2
(45) Date of Patent: Oct. 15, 2002

(54) BLOW MOLDED WHEEL WITH AXLE RETAINER

(76) Inventor: Floyd F. Markling, 3538 Caya Largo Ct., Punta Gorda, FL (US) 33950

(*) Notice: Subject to any disclaimer, the term of this patent is extended or adjusted under 35 U.S.C. 154(b) by 0 days.

(21) Appl. No.: 09/757,448

(22) Filed: Jan. 9, 2001

(65) Prior Publication Data

US 2001/0001222 A1 May 17, 2001

Related U.S. Application Data

(62) Division of application No. 09/090,618, filed on Jun. 4, 1998, now Pat. No. 6,170,920.

(51) Int. Cl.⁷ .............................. B60B 7/06; B60B 5/02
(52) U.S. Cl. .............................. 301/111.03; 301/64.705; 301/121; 264/271.1
(58) Field of Search ................................ 301/112, 118, 301/119, 120, 121, 122, 111.01, 111.03, 64.701, 64.705, 64.704; 264/249, 271.1, 274

(56) References Cited

U.S. PATENT DOCUMENTS

| | | | | |
|---|---|---|---|---|
| 3,207,830 A | * | 9/1965 | Aldington | 264/249 |
| 3,497,952 A | * | 3/1970 | King et al. | 264/249 |
| 3,694,540 A | * | 9/1972 | Slan | 264/249 |
| 3,894,776 A | * | 7/1975 | Black | 301/64.7 X |
| RE30,030 E | * | 6/1979 | Coran et al. | 152/323 |
| 4,428,899 A | * | 7/1984 | van Manen | 264/271.1 X |
| 4,592,595 A | * | 6/1986 | Freeman | 301/64.7 |
| 4,674,759 A | * | 6/1987 | Parker | 301/122 X |
| 4,870,736 A | * | 10/1989 | Kacalieff | 301/64.7 X |
| 5,104,198 A | * | 4/1992 | Prout et al. | 301/64.7 |
| 5,316,377 A | * | 5/1994 | Markling et al. | 301/64.7 |
| 5,368,371 A | * | 11/1994 | Markling | 301/64.7 |
| 6,170,920 B1 | * | 1/2001 | Markling | 301/111 |

FOREIGN PATENT DOCUMENTS

EP 508902 * 10/1992 .................. 301/111

* cited by examiner

Primary Examiner—Russell D. Stormer
(74) Attorney, Agent, or Firm—DL Tschida

(57) ABSTRACT

A blow-molded wheel including an axle retainer assembly. The retainer assembly includes a housing having transverse sleeves that support an axle and a spring biased retainer pin that mounts to an annular groove at the axle. The housing is supported in a cavity formed into a wheel spoke and a bore of a wheel hub and is retained upon the shrinkage of the plastic around the housing. An aperture of the pin sleeve facilitates retraction of the pin and release of the wheel from the axle.

5 Claims, 5 Drawing Sheets

BLOW MOLDED WHEEL WITH AXLE RETAINER

This is a divisional application Ser. No. 09/090,618, filed on Jun. 4, 1998, now U.S. Pat. No. 6,170,920.

BACKGROUND OF THE INVENTION

The present invention relates to plastic wheels and, in particular, to a blow molded wheel having a spring biased axle retainer.

Varieties of pneumatic and composite wheels have been developed that include integral axle retainers. Some available composite wheels include an injection-molded hub that supports a molded rubber tread piece at a flanged rim. The tread piece is separately attached to the hub, such as by stretching. A spring-biased pin is molded into the hub and the pin projects into the bore of an axle support. With the attachment of the wheel to an axle having a mating annular recess, the pin depresses and expands into the recess to permanently secure the wheel to the axle. The pin otherwise is not exposed to facilitate detachment of the wheel.

An all plastic wheel can provide a cost-effective alternative. However, all plastic wheels are generally not available that include an integral retainer. A blow-molded wheel that does include a retainer is shown at U.S. Pat. No. 5,368,371. The retainer consists of annular tabs that extend into an axle bore and that mount to a grooved recess at a mating axle. The strength of the tabs can limit the type of applications to which such wheels are placed. The tabs are also prone to damage, if the wheels are removed.

The present invention was developed to provide an improved blow-molded plastic wheel having an integral axle retainer. The wheel provides an externally accessible, spring biased pin retainer that is inserted into a blow-molded wheel. The wheel includes a tread surface that can be molded as part of the wheel or that can be separately attached to the wheel. A spring biased pin radially projects from a pin retainer sleeve that is fitted to an axle sleeve. The axle sleeve provides a load bearing surface for the axle.

SUMMARY OF THE INVENTION

It is accordingly a primary object of the invention to provide a blow molded wheel with an integral axle retainer.

It is a further object of the invention to provide a wheel having an axle retainer that indexes to a separately molded wheel and includes a pin and axle sleeve that extend transverse to one another.

It is a further object of the invention to provide a wheel with an axle retainer pin that can be released from the axle after mounting.

It is a further object of the invention to provide a retainer that can be mounted to the wheel prior to final cure.

Various of the foregoing objects, advantages and distinctions of the invention are obtained in a presently preferred blow-molded wheel. The wheel is blow molded in conventional fashion and includes a cavity at one of the spokes that is shaped to accept a spring biased retainer. The cavity opens to an axle bore at the wheel. The retainer is set into the cavity immediately upon the wheel being withdrawn from the mold, while the plastic is warm. The plastic shrinks around the retainer as it cools and permanently secures the retainer to the wheel.

The retainer includes a pin sleeve that supports a spring within a longitudinal bore. The spring biases the retainer pin to project into a longitudinal bore of an axle sleeve. The axle sleeve concentrically mounts within the axle bore. The bore of the axle sleeve acts as a bushing and provides a load bearing surface for the axle. The bore of the axle sleeve extends transverse to the bore of the pin sleeve. An opening is provided through the walls of the pin sleeve to permit release of the pin from the axle.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
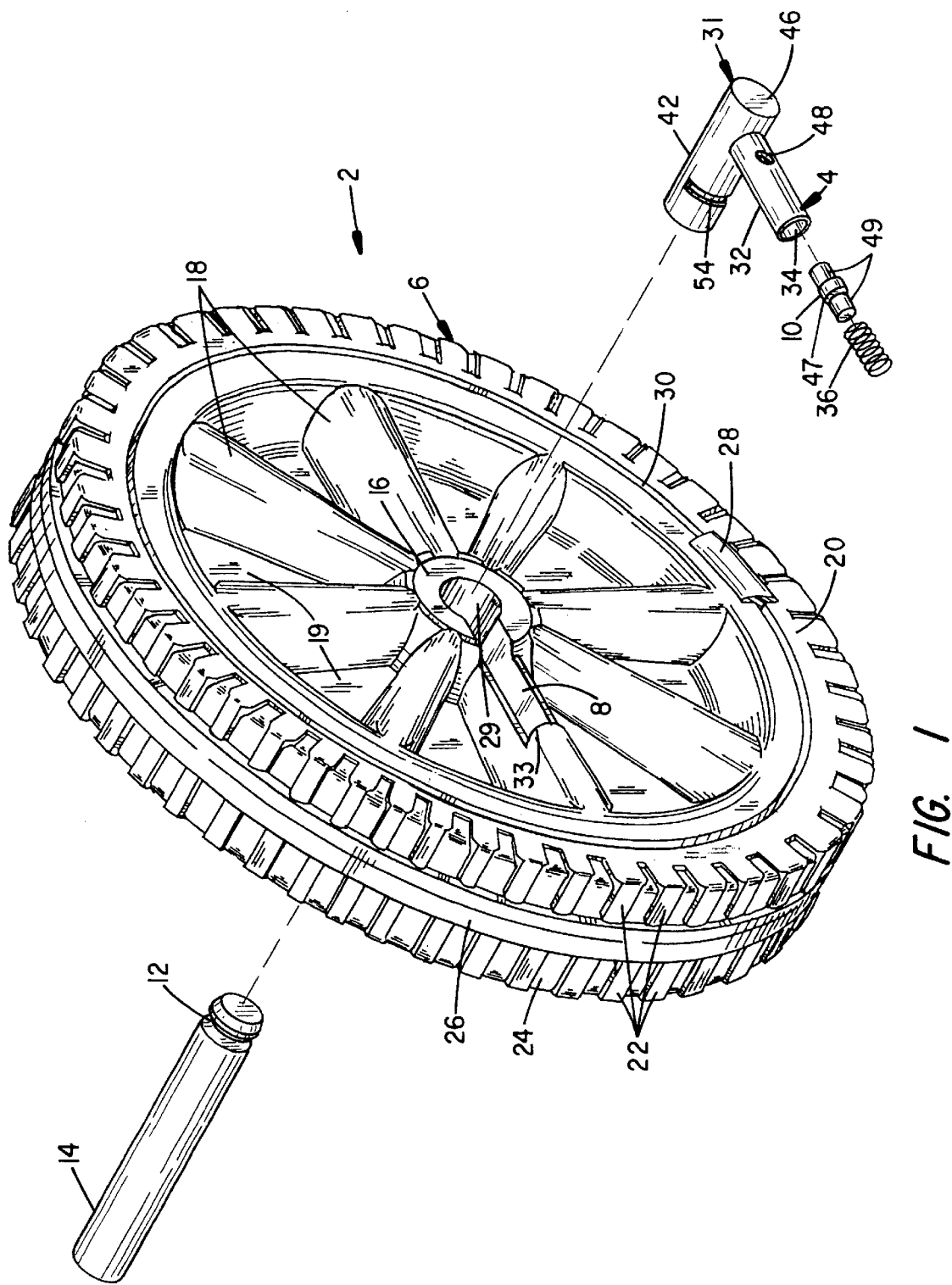
FIG. 1 is a perspective view shown in exploded assembly to a wheel constructed with a releasable axle retainer assembly.
Figure 2:
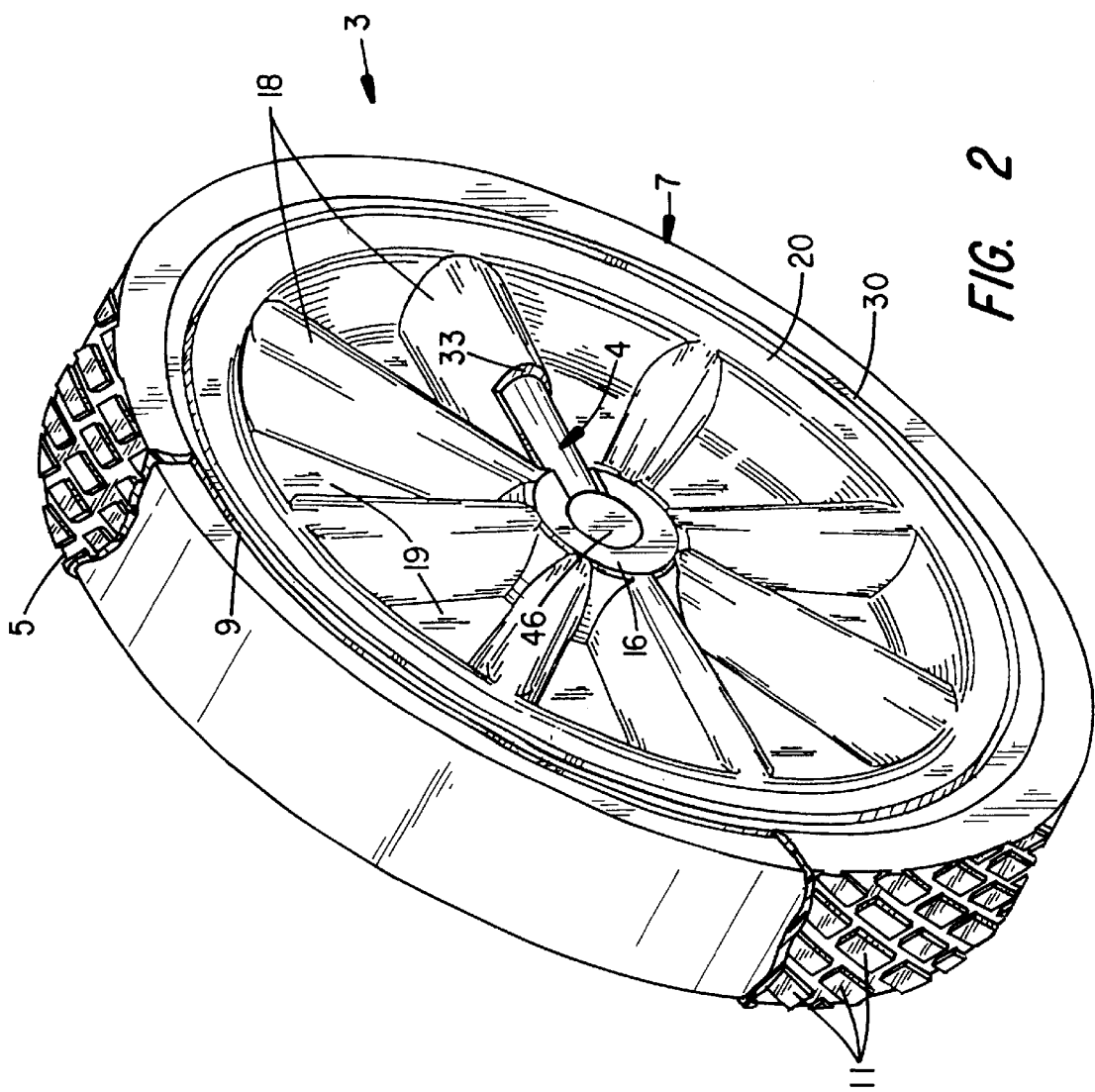
FIG. 2 is a perspective view shown in partial cutaway to a blow molded wheel having a tread piece mounted over the wheel and fitted with an axle retainer assembly.
Figure 3:
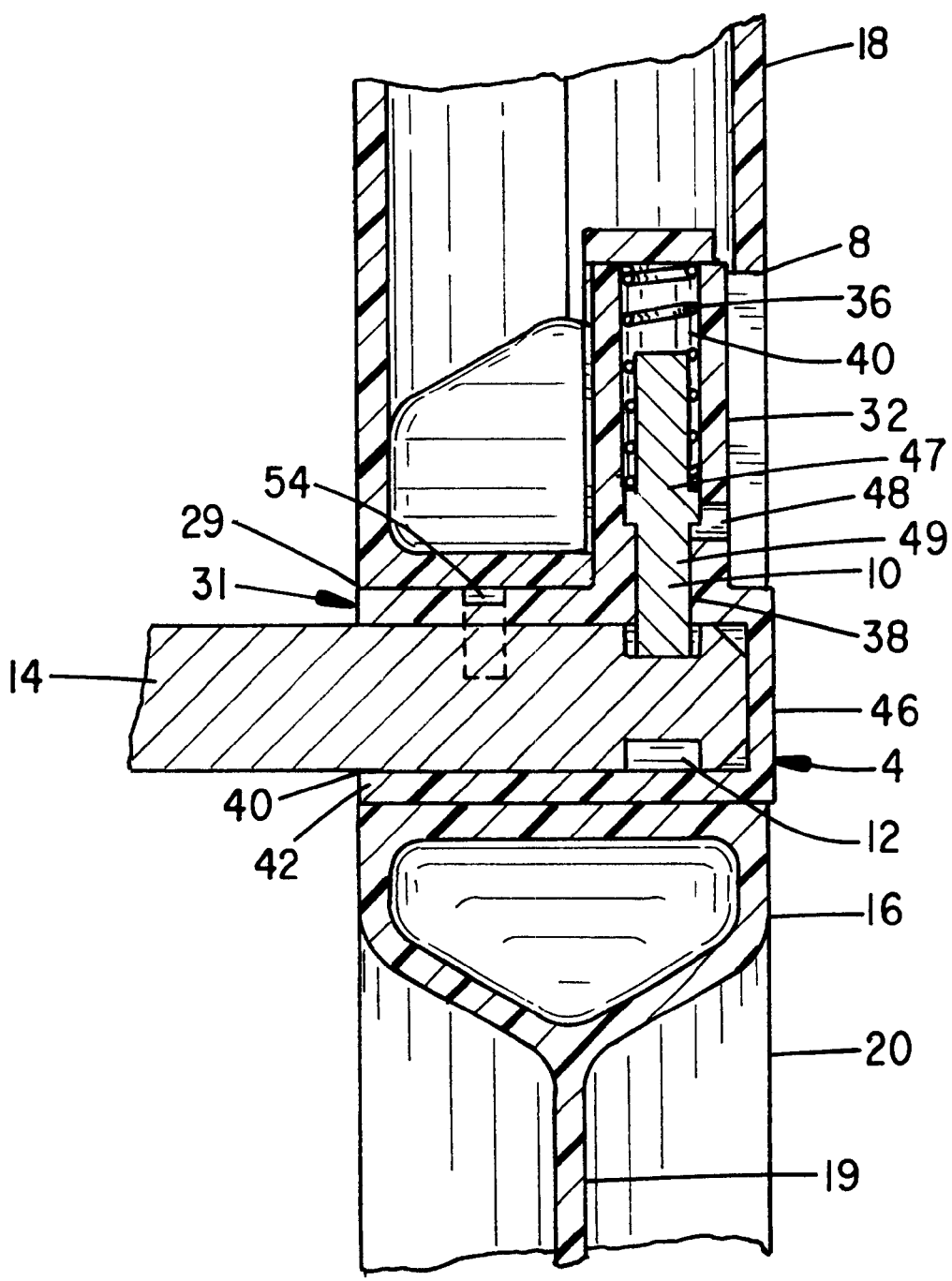
FIG. 3 is a partial section view through the axle and retainer of FIG. 1, when mounted together.
Figure 5:
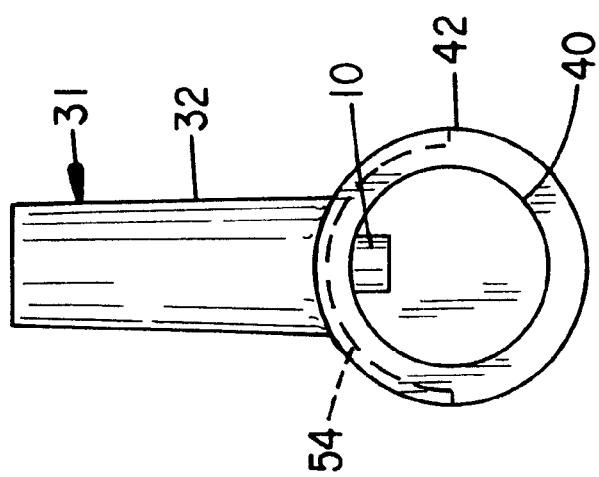
FIG. 5 is a rear view of the retainer.

Referring to FIGS. 1, 2 and 3, views are shown to improved wheels 2 and 3 that are fitted with an axle retainer assembly 4. The wheels 2 and 3 are constructed from blow-molded plastic wheels 6 and 7. The wheels 6 and 7 each include a cavity 8 that receives an axle retainer assembly 4. A double-ended pin 10 of the assembly 4 aligns with and mounts to an annular groove 12 of an axle 14.

The wheels 6 and 7 are blow-molded in conventional fashion and provide a hub 16 and from which a number of spokes 18 and intermediate flat webs 19 radiate to an annular box or rim 20. The wheel 6 includes a number of lugged treads 22. The treads 22 are molded into a surface 24 that engages the ground. A raised band 26 projects around the circumference of the wheel 6 and above the treads 22 at the center of the tread surface 24. An accessory trim piece or whitewall 28 can be attached to an annular groove 30 that is formed into one or both exposed side wall faces of the box 20.

The blow-molded wheel 3 of FIG. 2 is substantially the same as the wheel 2, except a separately molded tread piece 5 is mounted to the box 20. A smooth, recessed surface 7 of the box 20 includes a flange 9 and to which the tread piece 5 is aligned. The tread piece 5 is molded from an ethylene methyl acrylate (EMA) copolymer, although an EEA, EVA or LLDPE material, among other materials could be used. A number of lugged treads 11 are molded into the tread piece 5.

Returning attention to FIG. 1, the cavity 8 is molded into one of the spokes 18. The cavity 8 opens at one end into an axle bore 29. An opposite end provides a closed wall 33. A housing 31 of the assembly 4 includes a pin sleeve 32 that mounts within the cavity 8. The pin 10 is supported within a bore 34 of the pin sleeve 32 and is biased to permit reciprocating movement in conjunction with a spring 36. The pin 10 projects through an aperture 38, reference FIG. 3, and into a longitudinal bore 40 of an axle sleeve 42 that extends transverse to the pin sleeve. The spring 36 abuts the wall 33 at the open end of the pin sleeve 32.

Figure 6:
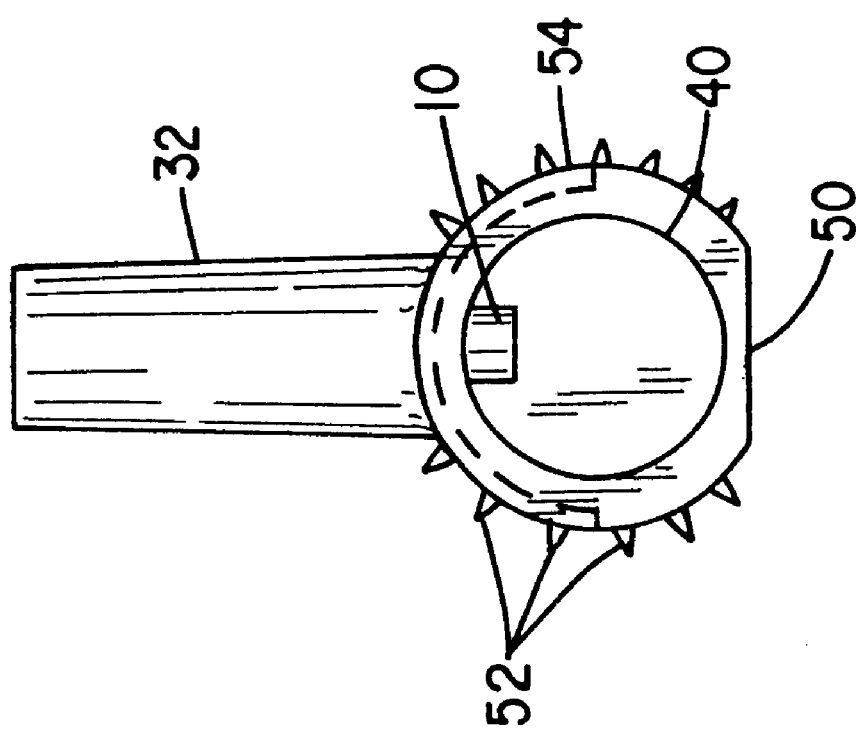
FIG. 6 is a rear view of a retainer wherein the external surface is formed to enhance attachment to the blow-molded wheel.

The bore 40 separately accepts the axle 14. The bore 40 provides a load-bearing surface for the axle 14. A cover 46 closes the end of the housing 31 and bore 40. The housing 31 is retained to the wheel 6 at the pin and axle sleeves 32 and 42. The transverse orientation of the pin and axle sleeves 32 and 42 to one another assures that the retainer assembly 4 does not loosen and rotate with the wheel 6. The retainer housing 31 can be bonded to the wheel 6. Presently it is secured through the shrinkage of the wheel material. If required, retention can be enhanced by forming the external walls of the retainer to include shaped surfaces such as described below in relation to FIG. 6.

Figure 4:
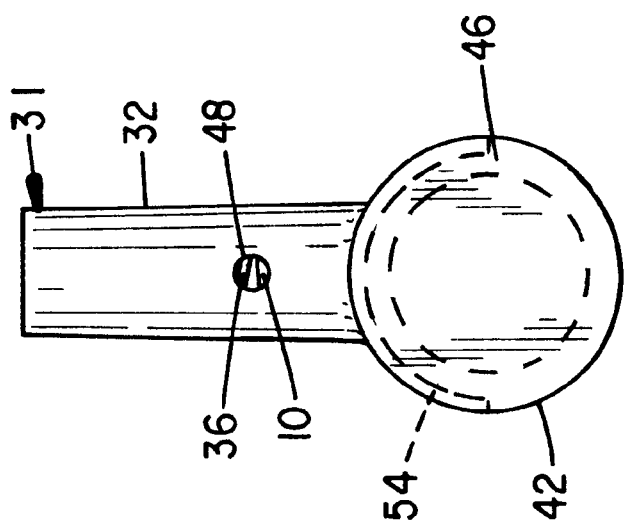
FIG. 4 is a front view of the retainer.

With additional attention to FIGS. 3 and 4, an aperture or 48 extends through a side wall of the axle sleeve 32 and is exposed at the wheel 6 to permit access to the pin 10. By inserting a tool through the aperture 48, a shoulder 47 of the pin 10 can be engaged and the pin 10 can be depressed to release one of a pair of ends 49 from the axle 14. The aperture 48 can be flashed over, such as in FIG. 2, when molding the pin and axle sleeves 32 and 42 to prevent access to the pin 10.

Depending upon the application, the wheels 6 and 7 can be molded from a variety of types of plastic. The type of plastic and density of material can be varied to a particular application and the load and wear specifications for a particular wheel. The configuration and size of the wheels 6 and 7 can also be varied. The wheels 6 and 7 are presently molded from a high-density polyethylene material and each is constructed to a 12-inch diameter. A variety of other known materials can be used to equal advantage.

The retainer housing 31 is molded from a material that is compatible to the wheel material. An HDPE material is presently used. Depending on the application, however, the housing 31 can be constructed from a variety of other materials including various metals and plastics. The pin 10 is constructed from metal. Various other materials can be used provided they are able to withstand anticipated wear at the axle 14.

After extracting the wheel 6 from its mold and while the plastic is warm, the retainer assembly 4 is fitted to the cavity 8 and the bore 31. As the wheel 6 cools, the material shrinks around the axle sleeves 32 and 42 to permanently mount the retainer assembly 4 to the wheel 6. Although not presently required, retention might be enhanced by shaping the external surfaces of the sleeves 32 and 42 to grip mating surfaces of the wheels 6 and 7. For example and with additional attention to FIG. 6, a flat surface 50 and/or raised projections 52 and/or one or more recesses can be provided. Presently, a recessed groove 54 is included. The groove 54 separately aids in the extraction of the retainer housing 31 from an injection mold. The raised projections 52 can be formed as annular ribs or knurling.

While the invention has been described with respect to a preferred construction and considered improvements or alternatives thereto, still other constructions may be suggested to those skilled in the art. The foregoing description should therefore be construed to include all those embodiments within the spirit and scope of the following claims.

What is claimed is:

1. A molded plastic wheel adapted to mount to an axle, comprising a) an annular body that is integrally molded from a first material exhibiting a first density and that includes a hollow hub having an axle bore and a plurality of hollow spokes that radially extend from said hub to a hollow box defined by planar first and second side wall surfaces that extend from said spokes and orthogonal to a peripheral tread surface that extends parallel to said axle bore, wherein hollow cavities of said hub, said spokes and said box communicate with each other;

b) retainer means mounted in said axle bore for securing the wheel to the axle and comprising a retainer housing that includes i) an external surface adapted to mount in said axle bore without rotating, ii) a pin bore having first and second open ends and wherein said first open end communicates with said axle bore and said second open end abuts a wall surface displaced from said tread surface, iii) a pin mounted in said pin bore, and iv) a resilient member abutting the displaced wall surface for biasing the pin for reciprocating movement relative to the axle bore; and c) an annular tread piece separately molded from a second material exhibiting a second density different from the first material and having a channel shape with first and second side pieces that project orthogonal to a connecting tread band and wherein said tread piece is mounted over said box such that said tread band overlies said tread surface and said first and second side pieces abut said first and second side wall surfaces.

2. A method for constructing a self retaining wheel, comprising:

a) blow molding a wheel from a first material having a first density, wherein said wheel has an annular body that includes a hub having an axle bore and a plurality of hollow spokes and webs that radially extend from said hub to a hollow box defined by first and second planar side wall surfaces that extend from said spokes to a tread surface, wherein a plurality of hollow cavities in said hub, said spokes and said box communicate with each other, and wherein said first and second side wall surfaces extend orthogonal to said tread surface;

b) extracting the wheel from a mold and, while the wheel is warm, fitting a retainer housing to said axle bore that includes a pin and means for biasing the pin for reciprocating movement to project into said axle bore and such that the pin is displaced from the tread surface;

c) mounting an annular tread piece molded from a second material exhibiting a second density different from the first material and having a channel shape with first and second side pieces that project orthogonal to a connecting tread band and wherein said tread piece is mounted over said box such that said tread band overlies said tread surface and said first and second side pieces abut said first and second side wall surfaces; and d) permitting the wheel to cool and the plastic material to shrink around the retainer housing to secure the retainer housing to the wheel.

3. A method as set forth in claim 2 wherein at least one of said first and second sidewall surfaces includes a raised annular flange and wherein a peripheral edge of one of said first and second side pieces abuts said flange.

4. A method for constructing a self retaining wheel, comprising:

a) blow molding a wheel from a first material having a first density, wherein said wheel has an annular body that includes a hollow hub coupled to a concentric hollow box defined by first and second planar side wall surfaces that project orthogonal from a tread surface toward said hub and wherein said hollow cavities of said hub and box communicate with each other;

b) extracting the wheel from a mold and, while the wheel is warm, fitting a retainer housing to said axle bore that includes a pin and a resilient member for biasing the pin for reciprocating movement to project into said axle bore and such that the pin and resilient member are displaced from the tread surface;

c) mounting an annular tread piece molded from a second material exhibiting a second density different from the first material and having a channel shape with first and second side pieces that project orthogonal to a connecting tread band and wherein said tread piece is mounted over said box such that said tread band overlies said tread surface and said first and second side pieces abut said first and second side wall surfaces; and d) permitting the wheel to cool and the plastic material to shrink around the retainer housing to secure the retainer housing to the wheel.

5. A method for constructing a self retaining wheel, comprising:

a) blow molding a wheel from a first material having a first density, wherein said wheel has an annular body that includes a hollow hub coupled to a concentric hollow box defined by first and second planar side wall surfaces that project orthogonal from a tread surface toward said hub and wherein said hollow cavities of said hub and box communicate with each other;

b) extracting the wheel from a mold and, while the wheel is warm, fitting a retainer housing to said axle bore that includes a pin and a resilient member for biasing the pin for reciprocating movement to project into said axle bore and such that the pin is displaced from the tread surface;

c) mounting an annular tread piece molded from a second material exhibiting a second density different from the first material and wherein said tread piece is mounted over said box such that said tread band overlies said tread; and d) permitting the wheel to cool and the plastic material to shrink around the retainer housing to secure the retainer housing to the wheel.

* * * * *